(12) United States Patent
Kawai et al.

(10) Patent No.: US 9,718,460 B2
(45) Date of Patent: Aug. 1, 2017

(54) CONTROL DEVICE FOR HYBRID VEHICLE

(71) Applicant: TOYOTA JIDOSHA KABUSHIKI KAISHA, Toyota-shi, Aichi-ken (JP)

(72) Inventors: Takashi Kawai, Gotemba (JP); Takuro Kumada, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/038,920

(22) PCT Filed: Nov. 18, 2014

(86) PCT No.: PCT/IB2014/002464
§ 371 (c)(1),
(2) Date: May 24, 2016

(87) PCT Pub. No.: WO2015/079298
PCT Pub. Date: Jun. 4, 2015

(65) Prior Publication Data
US 2016/0375894 A1  Dec. 29, 2016

(30) Foreign Application Priority Data

Nov. 28, 2013 (JP) .................. 2013-246490

(51) Int. Cl.
*B60W 10/08* (2006.01)
*B60W 20/00* (2016.01)
(Continued)

(52) U.S. Cl.
CPC .............. *B60W 20/15* (2016.01); *B60K 6/26* (2013.01); *B60K 6/445* (2013.01); *B60W 10/08* (2013.01);
(Continued)

(58) Field of Classification Search
CPC ...... B60W 20/15; B60W 20/17; B60W 30/20; B60W 10/08; B60W 2510/083;
(Continued)

(56) References Cited

U.S. PATENT DOCUMENTS 7,121,975 B2 * 10/2006 Tomura ................. B60K 6/445
  180/65.235
8,996,220 B2 * 3/2015 Ohno .................... B60W 10/08
  180/65.21
(Continued)

FOREIGN PATENT DOCUMENTS

JP    2002364407 A   12/2002
JP    2010-023790 A   2/2010
(Continued)

*Primary Examiner* — Michael J Zanelli
(74) *Attorney, Agent, or Firm* — Sughrue Mion, PLLC

(57) ABSTRACT

An electronic control unit is mounted on a vehicle including an internal combustion engine and electric motors, each of which is connected to a driving shaft to be capable of transmitting power. The electronic control unit is configured to compute compensation torque reducing a pulsation component of engine torque of the internal combustion engine and command a value in which required torque of the electric motor is combined with the computed compensation torque to the electric motor as a torque command value of the electric motor. The electronic control unit is configured to correct the torque command value so that the value opposite in sign to an average torque command value is not commanded to the electric motor when the average torque command value is smaller than an amplitude of the torque command value.

4 Claims, 7 Drawing Sheets

(51) Int. Cl.

| | |
|---|---|
| *B60W 30/20* | (2006.01) |
| *B60K 6/48* | (2007.10) |
| *B60W 20/15* | (2016.01) |
| *B60K 6/445* | (2007.10) |
| *B60W 20/17* | (2016.01) |
| *B60K 6/26* | (2007.10) |
| *B60K 6/46* | (2007.10) |

(52) U.S. Cl.
CPC ............ *B60W 20/17* (2016.01); *B60W 30/20* (2013.01); *B60K 6/46* (2013.01); *B60K 2006/266* (2013.01); *B60W 2030/206* (2013.01); *B60W 2510/0657* (2013.01); *B60W 2510/083* (2013.01); *B60W 2710/083* (2013.01); *B60W 2710/085* (2013.01); *B60Y 2200/92* (2013.01); *B60Y 2300/60* (2013.01); *Y02T 10/6239* (2013.01); *Y10S 903/906* (2013.01)

(58) Field of Classification Search
CPC ...... B60W 2030/206; B60W 2710/083; B60K 2006/266
See application file for complete search history.

(56) References Cited

U.S. PATENT DOCUMENTS

2012/0239237 A1* 9/2012 Hashimoto ............ B60K 6/365
 701/22
2012/0262102 A1* 10/2012 Gee ........................ B60T 8/173
 318/448

FOREIGN PATENT DOCUMENTS

| | | | |
|---|---|---|---|
| JP | 2012-131252 | * | 7/2012 |
| JP | 2015-113032 A | | 6/2015 |
| WO | 2015/087132 A1 | | 6/2015 |

* cited by examiner

CRANK ANGLE [deg]

CRANK ANGLE [deg]

DAMPING TORQUE PHASE WITH
RESPECT TO CRANK ANGLE [deg]

DAMPING TORQUE PHASE WITH
RESPECT TO CRANK ANGLE [deg]

CONTROL DEVICE FOR HYBRID VEHICLE

BACKGROUND OF THE INVENTION

1. Field of the Invention

The invention relates to a control device for a hybrid vehicle that uses an internal combustion engine and an electric motor as driving sources.

2. Description of Related Art

Proposed as an example of this type of device is a device that computes compensation torque removing an effect of a torque pulsation component relating to torque of a crankshaft from a driving shaft and corrects a torque command value of an electric motor by subtracting the computed compensation torque from the torque command value in a hybrid vehicle (refer to Japanese Patent Application Publication No. 2010-023790 (JP 2010-023790 A)).

SUMMARY OF THE INVENTION

According to the related art described above, the compensation torque is computed by using a torque transmission function from a driving source to the driving shaft. Accordingly, it may be difficult to sufficiently suppress the effect of the torque pulsation component in the event of change in transmission characteristics of the driving shaft attributable to, for example, secular change and environment of vehicle use.

The invention provides a control device for a hybrid vehicle capable of improving robustness of control for suppressing an effect of a torque pulsation component.

According to an aspect of the invention, there is provided a control device for a vehicle. The vehicle includes an internal combustion engine connected to a driving shaft to transmit power and an electric motor connected to the driving shaft to transmit power. The control device includes an electronic control unit. The electronic control unit is configured to (a) compute compensation torque reducing a pulsation component of engine torque of the internal combustion engine, (b) command a value in which required torque of the electric motor is combined with the computed compensation torque to the electric motor as a torque command value of the electric motor, and (c) correct the torque command value so that the value opposite in sign to an average torque command value is not commanded to the electric motor when the average torque command value is smaller than an amplitude of the torque command value.

According to the invention, the control device for a hybrid vehicle is mounted on the vehicle including the internal combustion engine connected to the driving shaft to transmit power and the electric motor connected to the driving shaft to transmit power, the number of the electric motors being one or more. The "electric motor" according to the invention may be an electric motor realized in a motor generator (electric motor generator). In other words, the "electric motor" according to the invention may mean a motor generator insofar as the motor generator can function as an electric motor.

The control device including a memory, a processor, and the like computes the compensation torque reducing the pulsation component of the engine torque of the internal combustion engine. Various known aspects can be applied to a method for computing the compensation torque. Detailed description of the method will be omitted herein.

For example, the control device commands the value in which the required torque of the electric motor is combined with the computed compensation torque to the electric motor as the torque command value of the electric motor. Torque corresponding to the commanded torque command value is output from the electric motor so that vibration of the driving shaft, which is generated due to the pulsation component of the engine torque, can be reduced.

When the number of the electric motors of the vehicle is two or more, the computed compensation torque may be borne, at any sharing ratio, by the plurality of electric motors. In other words, the sum of the torque output from each of the plurality of electric motors as part of the compensation torque may match with the computed compensation torque.

Herein, the followings have been found according to research conducted by the inventor of the present application. Characteristics of transmission (for example, phase, gain, and the like) of the pulsation component of the engine torque output from the internal combustion engine to the driving shaft are not constant and may change due to, for example, product variations occurring during manufacturing, secular change, and environment of vehicle use (that is, variations may occur in the transmission characteristics from vehicle to vehicle). Then, deviation may occur between a value set in advance and an actual state of the vehicle in control (hereinafter, referred to as "damping control" as appropriate) for reducing the effect of the pulsation component of the engine torque such as compensation torque computation processing.

When the value of the torque output from the electric motor is close to 0 Nm, the value of the torque output from the electric motor may become a positive value or a negative value (hereinafter, referred to as "the value of the torque crosses 0 Nm" as appropriate) due to the compensation torque reducing the pulsation component. In other words, the compensation torque may cause the torque added to the driving shaft to become torque rotating the driving shaft in one direction or become torque rotating the driving shaft in the direction opposite to the one direction.

When deviation occurs between the set value relating to damping control and the actual state of the vehicle and the torque output from the electric motor is not 0 Nm by damping control, it becomes difficult to suppress torque fluctuation of the driving shaft and unintended vehicle vibration, abnormal noise, and the like may occur.

Even when no deviation occurs between the set value relating to damping control and the actual state of the vehicle, the torque fluctuation of the driving shaft can be suppressed to an allowable extent by damping control unless the torque output from the electric motor does not cross 0 Nm.

According to an aspect of the invention, the control device including the memory, the processor, and the like corrects the torque command value so that the value opposite in sign to the average torque command value is not commanded to the electric motor when the average torque command value is smaller than the amplitude of the torque command value.

Herein, the "when the average torque command value is smaller than the amplitude of the torque command value" may mean when the torque command value crosses 0 Nm if no countermeasure can be taken. The "average torque command value" may mean an average torque command value for a period corresponding to one explosion cycle of the internal combustion engine.

The "value opposite in sign to the average torque command value not being commanded to the electric motor" may mean no negative value being commanded to the electric motor as the torque command value when the average torque command value is a positive value and no positive value being commanded to the electric motor as the torque command value when the average torque command value is a negative value.

The control device corrects the torque command value as described above. Accordingly, the torque fluctuation of the driving shaft can be suppressed even when deviation occurs between the set value relating to damping control and the actual state of the vehicle.

According to an aspect of the invention, the control device may correct the torque command value so that the torque command value is at least zero when the average torque command value is a positive value. The control device may correct the torque command value so that the torque command value is equal to or less than zero when the average torque command value is a negative value.

According to this aspect, it is possible to prevent, with relative ease, the value opposite in sign to the average torque command value from being commanded to the electric motor.

Specifically, for example, the control device may correct the torque command value by decreasing the amplitude of the torque command value (that is, reducing the gain) so that the torque command value is at least zero when the average torque command value is a positive value and the torque command value is equal to or less than zero when the average torque command value is a negative value. Alternatively, the control device may allow a negative torque command value to become zero when the average torque command value is a positive value and allow a positive torque command value to become zero when the average torque command value is a negative value.

According to another aspect of the invention, the number of the electric motors of the vehicle may be two or more, and the control device may control a phase of the compensation torque to a phase in which fluctuation in the number of revolutions of one of the electric motors that is arranged on the most downstream side in a power transmission path toward the driving shaft from the internal combustion engine is minimized.

According to this aspect, the torque fluctuation of the driving shaft that is generated by the pulsation component of the engine torque can be suppressed appropriately.

Herein, the "electric motor that is arranged on the most downstream side in the power transmission path toward the driving shaft from the internal combustion engine" may mean the electric motor with the lowest number of backlash-provided components, such as a gear and a shaft, interposed between the electric motor and the driving shaft, that is, the electric motor that is least affected by the torque fluctuation.

A phase of damping control torque (that is, compensation torque) with respect to a crank angle, which is one of the set values relating to damping control, is set to an optimum phase for an appropriate process during manufacturing. However, when the state of the vehicle (specifically, for example, gear backlash state) changes due to secular change or the like, the optimum phase of the compensation torque with respect to the crank angle also changes.

Even when no deviation occurs between the set value relating to damping control and the actual state of the vehicle, the torque fluctuation of the driving shaft can be suppressed to an allowable extent by damping control unless the torque output from the electric motor does not cross 0 Nm as described above.

The torque fluctuation of the driving shaft can be further suppressed if the set value relating to damping control is allowed to be closer to the actual state of the vehicle.

Herein, it has been found, according to research conducted by the inventor of the present application that the rotation fluctuation of the electric motor (that is, the electric motor that is arranged on the most downstream side in the power transmission path to the driving shaft) with respect to the phase of the compensation torque matches with the amplitude change tendency of the torque fluctuation of the driving shaft and the phase of the compensation torque in which the rotation fluctuation of the electric motor is minimized is the optimum phase when the torque output from the electric motor does not cross 0 Nm.

As described above, the control device may control the phase of the compensation torque to the phase in which the fluctuation in the number of revolutions of the electric motor that is arranged on the most downstream side in the power transmission path toward the driving shaft from the internal combustion engine is minimized. Then, the set value relating to damping control can become closer to, the actual state of the vehicle, and the torque fluctuation of the driving shaft can be suppressed appropriately.

In addition, no torque sensor has to be additionally mounted on the driving shaft in order to change the phase of the compensation torque, which is highly advantageous for practical purposes.

According to another aspect of the invention, the control device may estimate an average input torque value input into the driving shaft. When the estimated average input torque value is equal to or smaller than a predetermined value and the average torque command value is smaller than the amplitude of the torque command value, the control device may correct the torque command value so that the value opposite in sign to the average torque command value is not commanded to the one or more electric motors.

According to this aspect, the control device including the memory, the processor, and the like estimates the average input torque value input into the driving shaft. Various known aspects can be applied to a method for estimating the input torque. Detailed description of the method will be omitted herein.

When the estimated average input torque value is equal to or smaller than a predetermined value and the average torque command value is smaller than the amplitude of the torque command value, the control device may correct the torque command value so that the value opposite in sign to the average torque command value is not commanded to the electric motor.

Herein, the followings have been found according to research conducted by the inventor of the present application. When, for example, a required driving force is small and accelerator opening is relatively small when an automatic transmission is set to a high gear or when an accelerator is slowly turned back ON after the accelerator is turned OFF, the driving force remains close to 0 Nm or crosses 0 Nm even when no deviation occurs between the set value relating to damping control and the actual state of the vehicle. If the torque output from the electric motor crosses 0 Nm in this case, unintended vehicle vibration, abnormal noise, and the like may be generated.

The "when the estimated average input torque value being equal to or smaller than a predetermined value" may mean when the driving force described above remains close to 0 Nm or crosses 0 Nm. The "predetermined value" may be set empirically, experimentally, or by simulation by obtaining a range in which unintended vehicle vibration, abnormal noise, and the like are generated from relationship between the input torque and a vehicle behavior (for example, whether vehicle vibration is generated or not) when torque that crosses 0 Nm is output from the electric motor and as input torque corresponding to a boundary value of the obtained range or as a value larger than the input torque by a margin of a predetermined value.

In this aspect, the control device may correct the torque command value so that the value opposite in sign to the average torque command value is not commanded to the electric motor when the estimated average input torque value is equal to or smaller than a predetermined value and the average torque command value is smaller than the amplitude of the torque command value. Accordingly, unintended vehicle vibration, abnormal noise, and the like attributable to the torque output from the electric motor can be suppressed by damping control.

Effects and other advantages of the invention will become apparent in the following description of an embodiment.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment relating to an electric motor control device of the invention will be described with reference to drawings.

Figure 1:
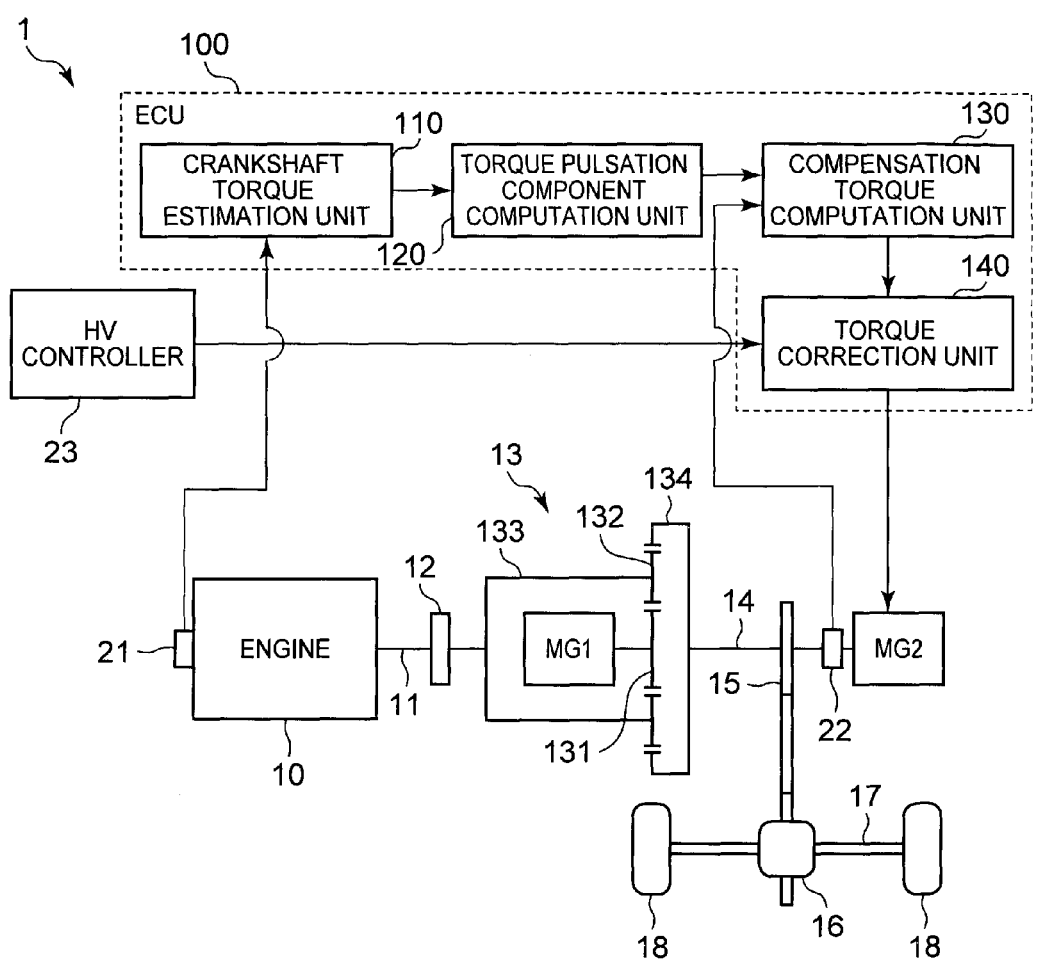
FIG. 1 is a conceptual diagram illustrating a main portion of a hybrid car on which an electric motor control device according to an embodiment is mounted.

Configuration of a vehicle on which the electric motor control device according to the embodiment is mounted will be described with reference to FIG. 1. FIG. 1 is a conceptual diagram illustrating a main portion of a hybrid car on which the electric motor control device according to the embodiment is mounted.

A hybrid car 1 in FIG. 1 includes an engine 10, a motor generator MG1, and a motor generator MG2 as power sources. A power distribution mechanism 13 is connected to a crankshaft 11 of the engine 10 via a torsional damper 12. The power distribution mechanism 13 is configured to have an external sun gear 131, an internal ring gear 134 that is arranged concentrically with the sun gear 131, a plurality of pinion gears 132 that are engaged with the sun gear 131 and are engaged with the ring gear 134, and a carrier 133 that holds the plurality of pinion gears 132 to be rotatable and revolvable. The power distribution mechanism 13 is configured as a planetary gear mechanism that performs a differential operation by using the sun gear 131, the ring gear 134, and the carrier 133 as rotation elements.

The crankshaft 11 of the engine 10 is connected to the carrier 133 of the power distribution mechanism 13. The motor generator MG1 is connected to the sun gear 131 of the power distribution mechanism 13. A reduction gear 15 is connected to the ring gear 134 of the power distribution mechanism 13 via a ring gear shaft 14.

When the motor generator MG1 functions as a generator, the power distribution mechanism 13 distributes power from the engine 10 input from the carrier 133 to the sun gear 131 side and the ring gear 134 side according to gear ratios of the sun gear 131 and the ring gear 134. When the motor generator MG1 functions as an electric motor, the power distribution mechanism 13 integrates power from the engine 10 input from the carrier 133 with power from the motor generator MG1 input from the sun gear 131 and outputs the integrated power to the ring gear 134 side.

The motor generator MG2 is also connected to the reduction gear 15. Power that is output to the ring gear 134 side of the power distribution mechanism 13 and power that is output from the motor generator MG2 are output to driving wheels 18 via the reduction gear 15, a differential gear 16, and a driving shaft 17.

The hybrid car 1 includes a HV controller 23 that sets target output of the engine 10 and respective torque command values of the motor generators MG1, MG2, and an electronic control unit (ECU) 100 that controls each of the motor generators MG1, MG2. The ECU 100 is an example of the control device for a hybrid vehicle according to the invention.

A map, in which relationship between the target output of the engine 10 or the respective torque command values of the motor generators MG1, MG2 and accelerating opening, vehicle speed, and the like is determined, is recorded in advanced in the HV controller 23. The target output of the engine 10 and the respective torque command values of the motor generators MG1, MG2 are set by applying information such as the accelerator opening and the vehicle speed to the map.

When the engine 10 is in operation, a torque pulsation component is generated in the crankshaft 11 based on a combustion cycle of the engine 10. The torque pulsation component is transmitted to the driving shaft 17 via a member that is directly or indirectly connected to the crankshaft 11, and vibration is generated in the driving shaft 17.

As described above, the ECU 100 controls each of the motor generators MG1, MG2. In particular, control of the motor generator MG2 for suppressing the vibration that is generated in the driving shaft 17 due to the torque pulsation component will be particularly described herein.

The ECU 100 is configured to have a crankshaft torque estimation unit 110, a torque pulsation component computation unit 120, a compensation torque computation unit 130, and a torque correction unit 140.

The crankshaft torque estimation unit 110 estimates crankshaft torque based on a crank angle that is detected by a crank angle sensor 21 and cylinder pressure that is detected by a cylinder pressure sensor (not illustrated). Various known aspects can be applied to a method for estimating the crankshaft torque. Detailed description of the method will be omitted herein.

The torque pulsation component computation unit 120 extracts the torque pulsation component from the estimated crankshaft torque. Specifically, for example, the torque pulsation component computation unit 120 performs high-pass filter processing such that an average value in the period of one cycle of the estimated crankshaft torque becomes zero, and computes the torque pulsation component. Various known aspects as well as the method described above can be applied to a method for computing the torque pulsation component.

The compensation torque computation unit 130 computes a compensation torque value that is output from the motor generator MG2, based on the computed torque pulsation component and a torque transmission function from a driving source to the driving shaft 17, to reduce the vibration of the driving shaft 17 attributable to the torque pulsation component. Various known aspects can be applied to a method for computing the compensation torque. Detailed description of the method will be omitted herein.

Figure 2:
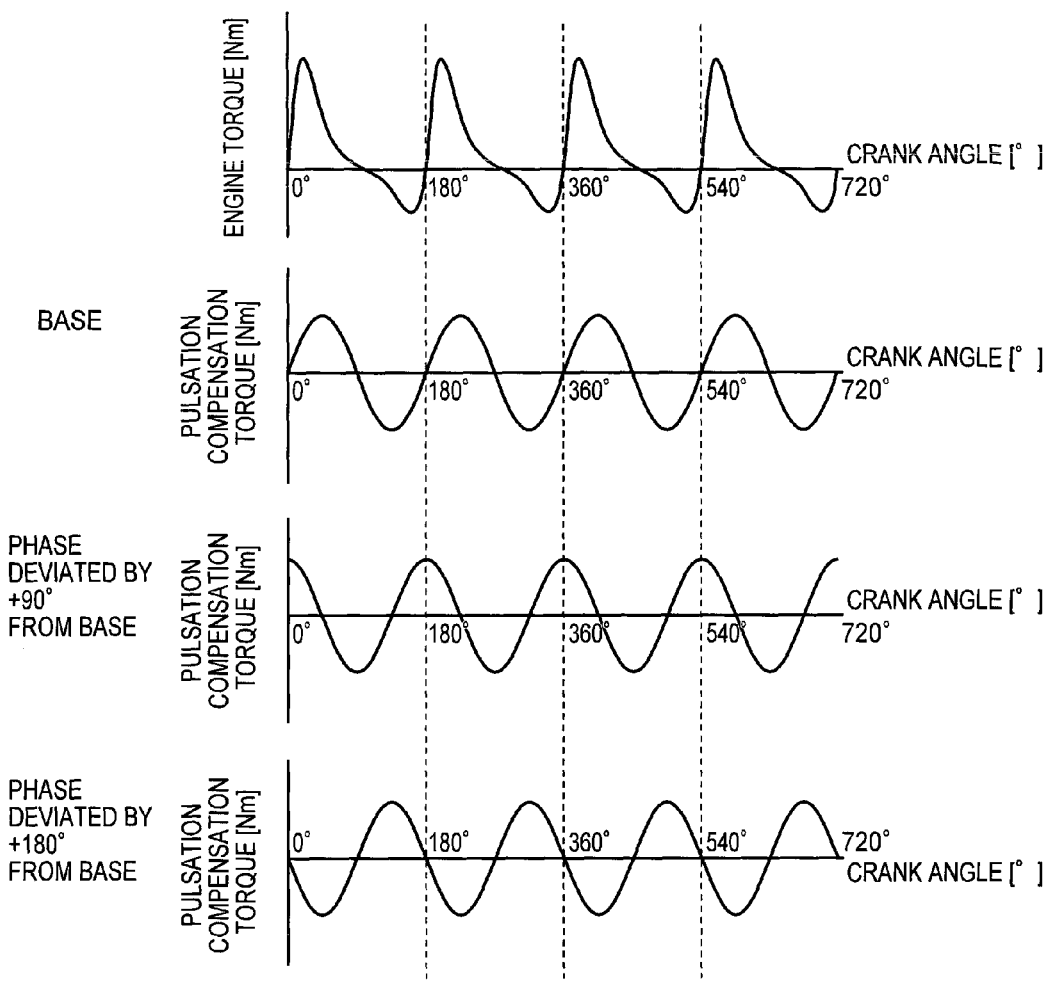
FIG. 2 is an example of engine torque and pulsation compensation torque.

FIG. 2 illustrates a specific example of the compensation torque. The drawing second from the top in FIG. 2 is an example of the compensation torque when a phase of engine torque and a phase of the vibration generated in the driving shaft 17 due to the torque pulsation component are aligned. The drawing third from the top in FIG. 2 is an example of the compensation torque when the phase of the vibration generated in the driving shaft 17 due to the torque pulsation component advances by 90 degrees with respect to the phase of the engine torque. The drawing fourth from the top in FIG. 2 is an example of the compensation torque when the phase of the vibration generated in the driving shaft 17 due to the torque pulsation component advances by 180 degrees with respect to the phase of the engine torque. The compensation torque is not limited to the sine curve illustrated in FIG. 2, and may be, for example, a triangular wave or a square wave.

The torque correction unit 140 determines the torque command value relating to the motor generator MG2 by combining a required torque value of the motor generator MG2 set by the HV controller 23 with the compensation torque value computed by the compensation torque computation unit 130.

When a signal showing the torque command value is transmitted to an inverter (not illustrated), the motor generator MG2 is controlled by the inverter according to the torque command value. As a result, the vibration that is generated in the driving shaft 17 due to the torque pulsation component which is generated in the crankshaft 11 is reduced.

Characteristics of transmission of the torque pulsation component generated in the crankshaft 11 to the driving shaft 17 differ from vehicle to vehicle due to various factors such as product variations, secular change, and environment of use. A parameter used in compensation torque computation and the like are set in advance to be optimized to an appropriate process during manufacturing. In this type of device, a value that is set in advance is not reset (or corrected) in most cases.

For example, when backlash occurs in a gear element that is present on a power transmission path due to secular change, deviation may occur between a value set in advance for damping control and an actual state of the hybrid car 1 (for example, a state where backlash occurs in the gear element).

Figure 3:
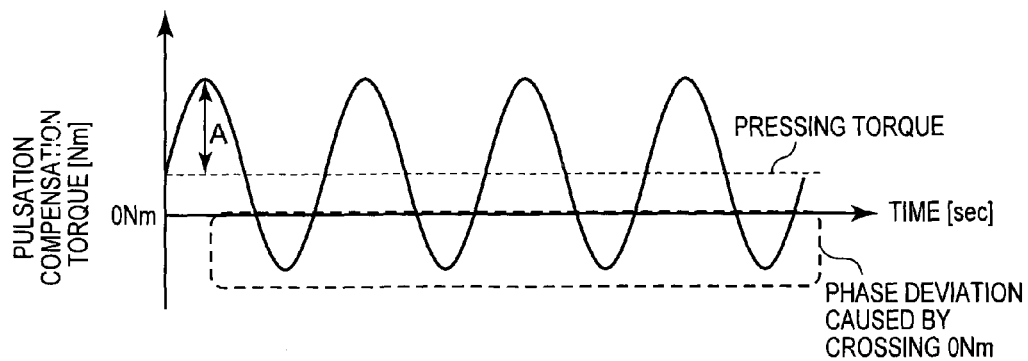
FIG. 3 is an example of a torque command value relating to a motor generator.

When the required torque value of the motor generator MG2 is close to 0 Nm and the required torque is combined with the compensation torque, the torque command value relating to the motor generator MG2 may become a positive value or a negative value as illustrated in, for example, FIG. 3. FIG. 3 is an example of the torque command value relating to the motor generator. "Pressing torque" in FIG. 3 is an example of the "required torque" according to this embodiment.

When the torque command value crosses 0 Nm, deviation may occur between a phase of the torque command value and the phase of the vibration generated in the driving shaft 17 due to the backlash of, for example, the gear element. Then, the vibration generated in the driving shaft 17 due to the torque pulsation component may be reduced insufficiently.

When the deviation occurs between the value set in advance for damping control and the actual state of the hybrid car 1 and the torque command value relating to the motor generator MG2 crosses 0 Nm, fluctuation of the driving shaft 17 and fluctuation of a gear constituting the differential gear 16 and the like may become significant due to damping control. Then, unintended vehicle vibration, abnormal noise, and the like may be generated.

Figure 4:
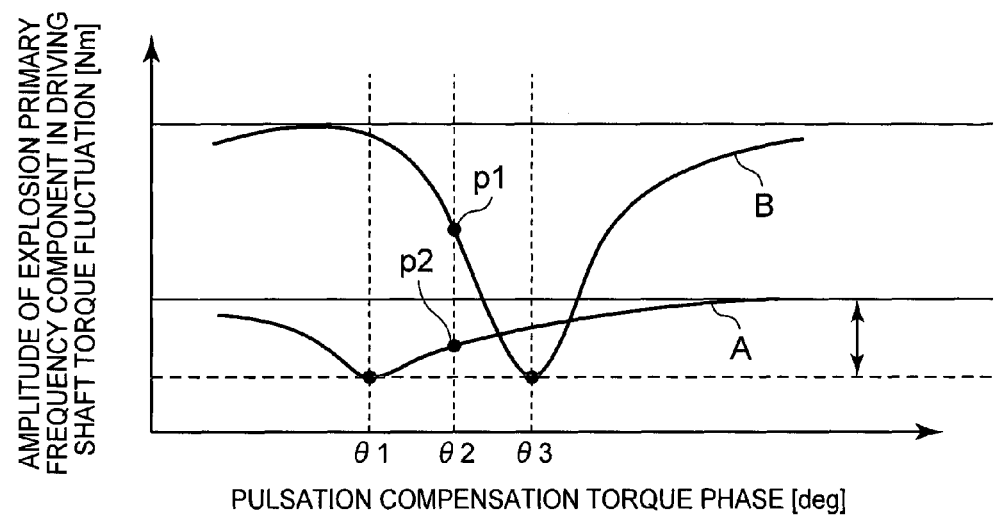
FIG. 4 is an example of amplitude of an explosion primary frequency component in driving shaft torque fluctuation.
Figure 5A:
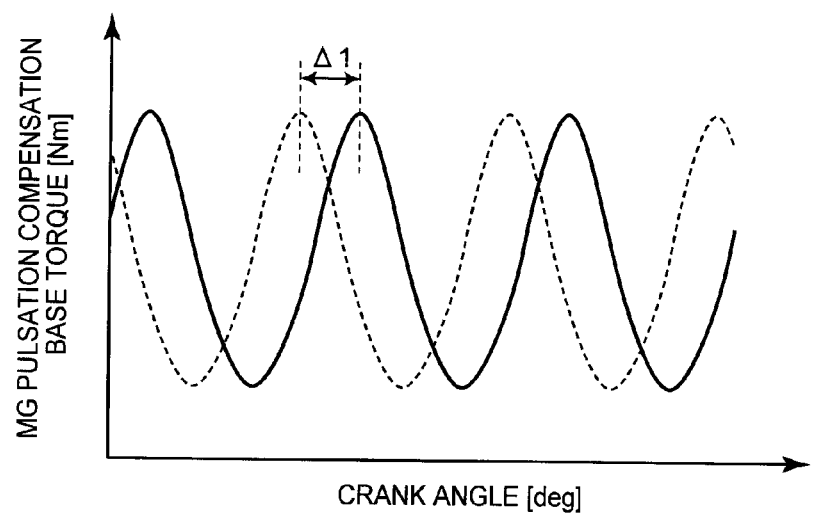
FIGS. 5A and 5B are an example of the pulsation compensation torque.
Figure 5B:
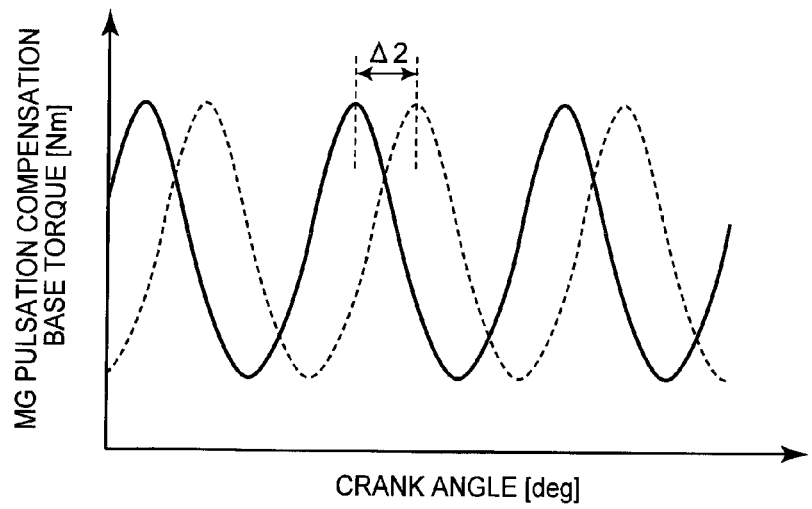

Herein, effect of the deviation occurring between the value set in advance for damping control and the actual state of the hybrid car 1 on damping control will be additionally described with reference to FIGS. 4, 5A, 5B. FIG. 4 is an example of amplitude of an explosion primary frequency component in driving shaft torque fluctuation. FIGS. 5A, 5B are an example of pulsation compensation torque.

The solid line A in FIG. 4 illustrates an example of relationship between a phase of the compensation torque and the amplitude of the explosion primary frequency component when the torque command value does not cross 0 Nm and the phase of the compensation torque (that is, an optimum phase) is $\theta 1$. The compensation torque is compensation torque that allows the vibration which is generated in the driving shaft 17 due to the torque pulsation component to be reduced to a minimum.

Likewise, the solid line B illustrates an example of relationship between the phase of the compensation torque and the amplitude of the explosion primary frequency component when the torque command value crosses 0 Nm and the optimum phase of the compensation torque is $\theta 3$.

In FIG. 4, a "phase of the pulsation compensation torque" means the phase of the compensation torque with respect to a phase of the crank angle. Accordingly, the value on the horizontal axis of the graph in FIG. 4 is phase difference between the crank angle and the compensation torque.

As is apparent from FIG. 4, the amplitude of the explosion primary frequency component increases when the phase of the compensation torque deviates from the optimum phase. In particular, the amplitude of the explosion primary frequency component increases significantly when the torque command value crosses 0 Nm and the phase of the compensation torque deviates from the optimum phase (refer to the solid line B).

It is assumed that the waveform of the compensation torque relating to damping control during an early stage of the manufacturing of the hybrid car 1 is set as the solid line in each of FIGS. 5A, 5B. If the state of the hybrid car 1 changes due to, for example, secular change, the waveform of the compensation torque also changes due to the change. Specifically, for example, the waveform of the compensation torque advances by phase $\Delta 1$ from the waveform of the compensation torque during the early stage of the manufacturing as illustrated in FIG. 5A. Alternatively, the waveform of the compensation torque is delayed by phase $\Delta 2$ from the waveform of the compensation torque during the early stage of the manufacturing as illustrated in FIG. 5B.

The change in the amplitude of the explosion primary frequency component when deviation occurs between the value set in advance for damping control and the actual state of the hybrid car 1 will be described again with reference to FIG. 4. The value set in advance for damping control is a value set during the early stage of the manufacturing. Herein, the optimum phase of the compensation torque relating to damping control is set in advance to θ2.

When the torque command value crosses 0 Nm and the optimum phase of the compensation torque corresponding to the actual state of the hybrid car 1 is θ3 (refer to the solid line B in FIG. 4), the amplitude of the explosion primary frequency component is a value at point p1 in FIG. 4 if the compensation torque is computed in the optimum phase θ2 set in advance. Accordingly, unintended vehicle vibration, abnormal noise, and the like are generated due to damping control as described above.

When the torque command value does not cross 0 Nm and the optimum phase of the compensation torque corresponding to the actual state of the hybrid car 1 is θ1 (refer to the solid line A in FIG. 4), the amplitude of the explosion primary frequency component is a value at point p2 in FIG. 4 if the compensation torque is computed in the optimum phase θ2 set in advance. In other words, the increment in the amplitude of the explosion primary frequency component is significantly smaller when the torque command value does not cross 0 Nm than when the torque command value crosses 0 Nm.

Accordingly, it can be confirmed that, the effect of the deviation is less significant, even when deviation occurs between the value set in advance for damping control and the actual state of the hybrid car 1, if the torque command value does not cross 0 Nm.

In this embodiment in particular, the torque correction unit 140 (refer to FIG. 1) corrects the torque command value such that the value opposite in sign to an average torque command value is not commanded to the motor generator MG2 the average torque, command value is smaller than the amplitude (refer to "A" in FIG. 3) of the torque command value. The case where the average torque command value is smaller than the amplitude of the torque command value may mean a case where the torque command value crosses 0 Nm if no countermeasure can be taken.

Figure 6A:
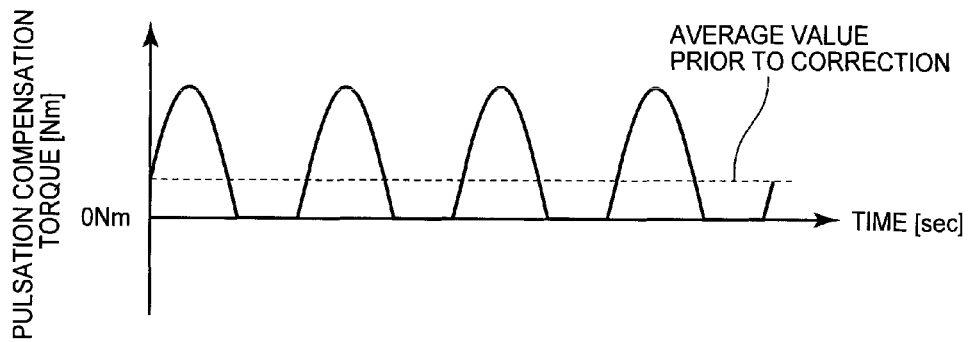
FIGS. 6A-6C are an example of the torque command value relating to the embodiment.
Figure 6B:
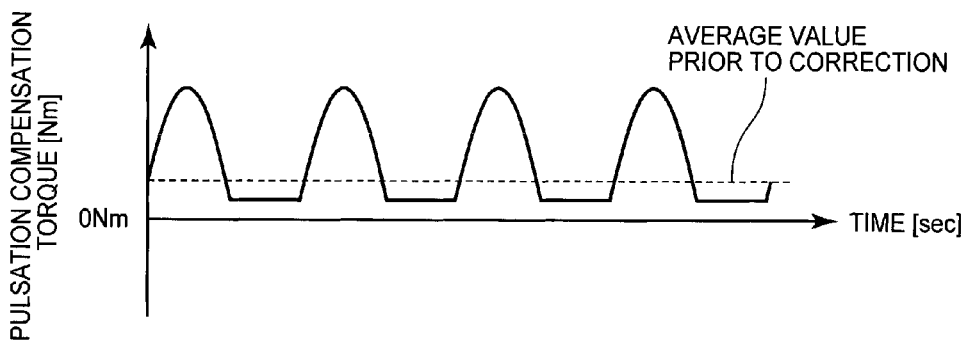
Figure 6C:
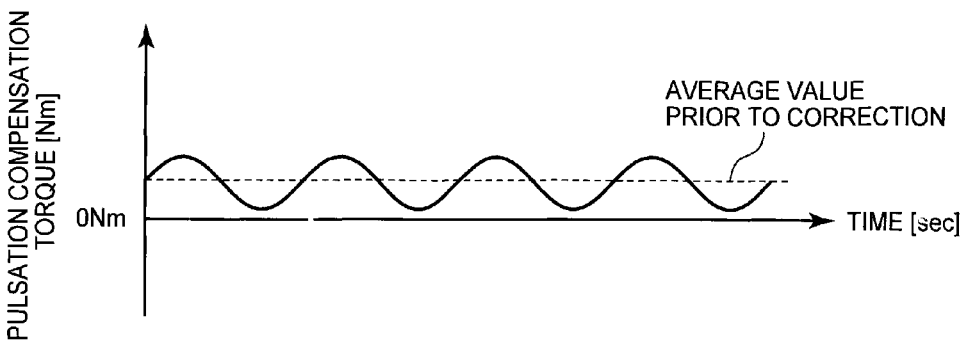
Figure 7A:
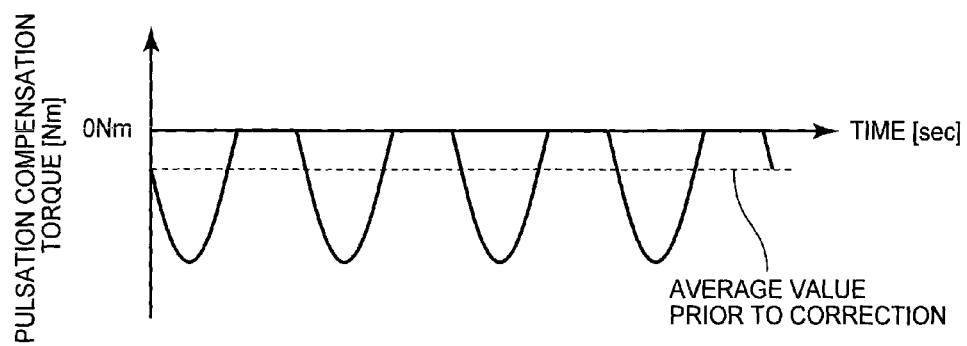
FIGS. 7A-7C are another example of the torque command value relating to the embodiment.
Figure 7B:
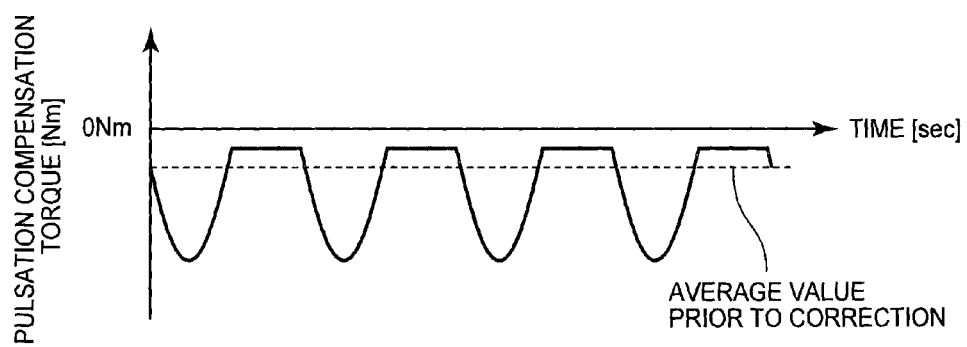
Figure 7C:
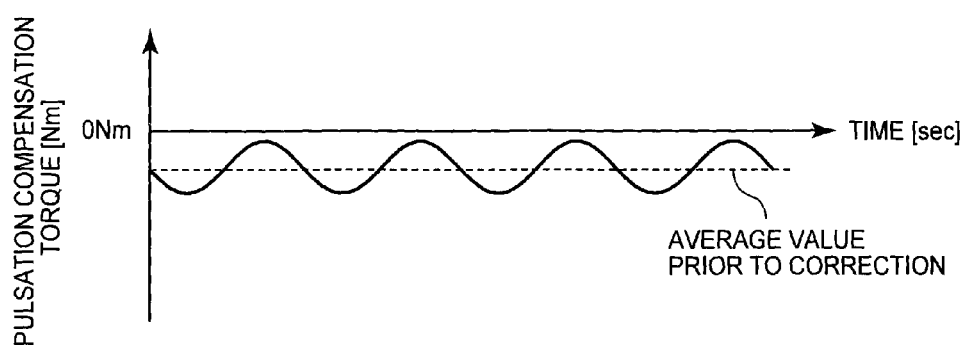

Specifically, for example, the torque correction unit 140 corrects the torque command value such that the torque command value becomes equal to or larger than zero when the average torque command value is a positive value (refer to FIGS. 6A, 6B, 6C). When the average torque command value is a negative value, the torque correction unit 140 corrects the torque command value such that the torque command value is equal to or less than zero (refer to FIGS. 7A, 7B, 7C).

During the correction of the torque command value, the negative torque command value may be corrected to zero when, for example, the average torque command value is a positive value (refer to FIG. 6A). Alternatively, the negative torque command value may be corrected to a predetermined positive value when the average torque command value is a positive value (refer to FIG. 6B). Alternatively, gain of the compensation torque may be lowered and then combined with the required torque of the motor generator MG2 (refer to FIG. 6C).

According to this configuration, the torque command value does not cross 0 Nm, and thus the generation of unintended vehicle vibration, abnormal noise, and the like can be suppressed even when deviation occurs between the value set in advance for damping control and the actual state of the hybrid car 1. Also, the vibration that is generated in the driving shaft 17 due to the torque pulsation component can be appropriately reduced. In other words, robustness of damping control can be improved.

According to research conducted by the inventor of the present application, the followings have been found when the torque command value of the motor generator MG2 does not cross 0 Nm. Rotation fluctuation of the motor generator MG2 with respect to the phase of the compensation torque matches with the amplitude change tendency of the torque fluctuation of the driving shaft 17, and a phase of the compensation torque in which the rotation fluctuation of the motor generator MG2 is minimized is the optimum phase.

Figure 8A:
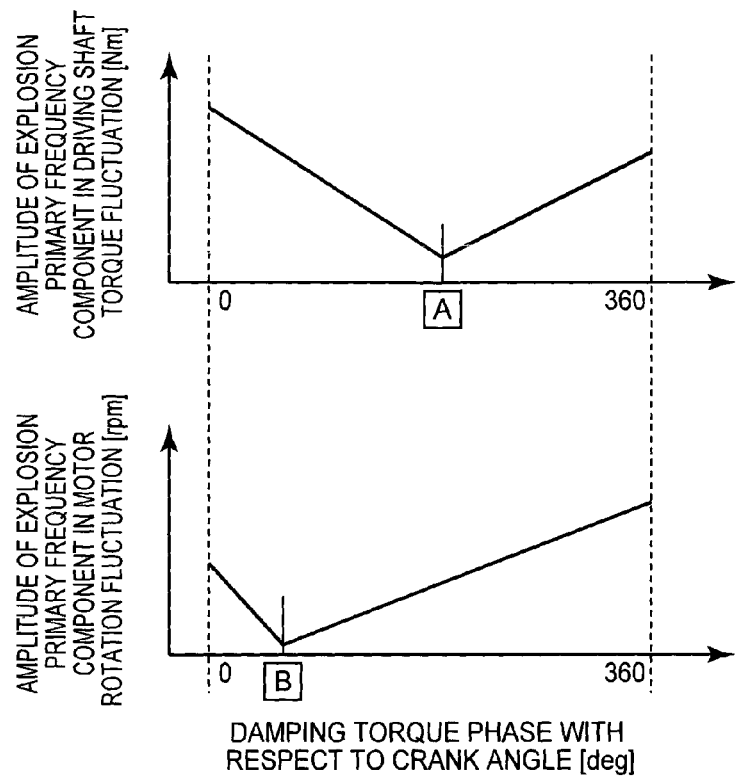
FIGS. 8A and 8B are a diagram illustrating an example of relationship between a phase in which the torque fluctuation of a driving shaft is minimized and a phase in which rotation fluctuation of the motor generator is minimized.
Figure 8B:
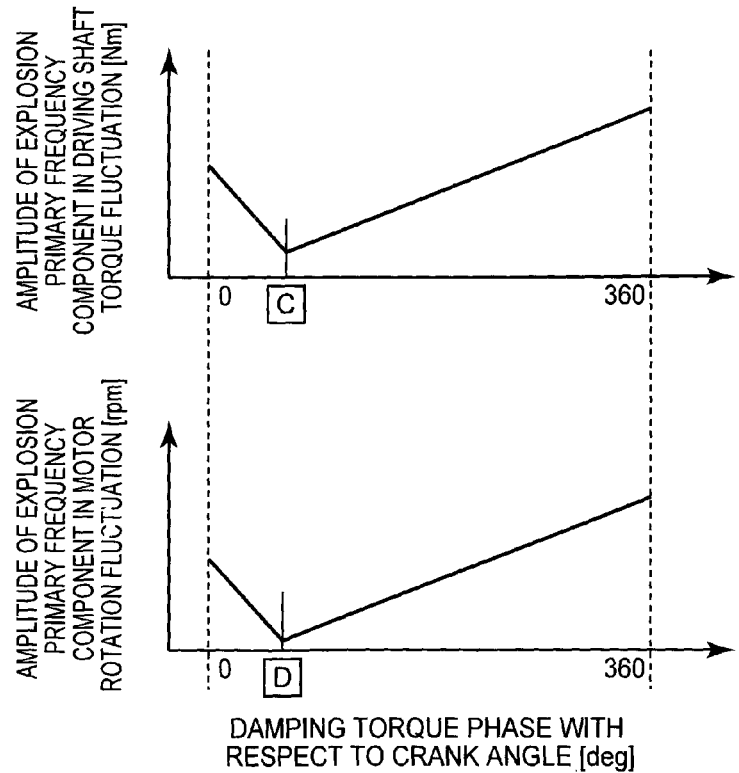

The above-described point will be additionally described with reference to FIGS. 8A, 8B. FIGS. 8A, 8B are drawings illustrating an example of relationship between the phase in which the torque fluctuation of the driving shaft is minimized and the phase in which the rotation fluctuation of the motor generator is minimized.

Firstly, a case where the torque command value crosses 0 Nm will be described with reference to FIG. 8A.

The reduction gear 15, the differential gear 16, and the like are present between the motor generator MG2 and the driving shaft 17 as illustrated in FIG. 1. Accordingly, for example, the direction of torque added to gears is reversed when the torque command value crosses 0 Nm, and a state where the gears that are in contact with each other are separated occurs. Then, due to the state where the gears that are in contact with each other are separated, the phase of the compensation torque in which the torque fluctuation of the driving shaft 17 is minimized (hereinafter, referred to as "phase A") differs from the phase of the compensation torque in which the rotation fluctuation of the motor generator MG2 is minimized (hereinafter, referred to as "phase B").

The state where the gears that are in contact with each other are separated does not occur when the torque command value does not cross 0 Nm. Accordingly, the phase of the compensation torque in which the torque fluctuation of the driving shaft 17 is minimized (hereinafter, referred to as "phase C") matches with the phase of the compensation torque in which the rotation fluctuation of the motor generator MG2 is minimized (hereinafter, referred to as "phase D") as illustrated in FIG. 8B.

In this embodiment, the compensation torque computation unit 130 (refer to FIG. 1) controls the phase of the compensation torque to the phase in which the rotation fluctuation of the motor generator MG2 is minimized based on an output signal from a resolver 22 (refer to FIG. 1) that is disposed in an output shaft of the motor generator MG2. In other words, in this embodiment, the compensation torque computation unit 130 corrects the phase of the compensation torque in the value set in advance for damping control.

According to this configuration, a value relating to damping control (the phase of the compensation torque herein) is allowed to be closer to the actual state of the hybrid car 1. As a result, the vibration that is generated in the driving shaft 17 due to the torque pulsation component can be reduced even more appropriately.

The "compensation torque computation unit 130" according to the embodiment is an example of the "control device" according to the invention. The "torque correction unit 140" according to the embodiment is an example of the "control device" according to the invention.

Next, a modification example of the control device for a hybrid vehicle according to the embodiment will be described.

In this modification example, an average input torque value input into the driving shaft 17 is estimated by the ECU 100 (refer to FIG. 1). Various known aspects can be applied to a method for estimating the input torque. Detailed description of the method will be omitted herein.

When the estimated average input torque value is equal to or smaller than a predetermined value and the average torque command value is smaller than the amplitude of the torque command value, the torque correction unit 140 (refer to FIG. 1) corrects the torque command value such that the value opposite in sign to the average torque command value is not commanded to the motor generator MG2. A specific example of the method for correcting the torque command value is similar to that of the embodiment described above.

Herein, the "case where the estimated average input torque value is equal to or smaller than a predetermined value" may mean a case where the input torque remains close to 0 Nm or crosses 0 Nm.

According to this configuration, the generation of unintended vehicle vibration, abnormal noise, and the like attributable to damping control can be suppressed when the input torque remains close to 0 Nm or crosses 0 Nm, examples of which include when a required driving force is small and the accelerator opening is relatively small when an automatic transmission is set to a high gear and when an accelerator is slowly turned back ON after the accelerator is turned OFF.

The invention is not limited to the embodiment described above, and can be modified as appropriate within a range not departing from the scope of claims and the gist or spirit of the invention clarified in the entire specification. Electric motor control devices entailing such modification are also included in the technical scope of the invention.

The invention claimed is:

1. A control device for a vehicle, the vehicle including an internal combustion engine connected to a driving shaft to transmit power, and an electric motor connected to the driving shaft to transmit power, the control device comprising:
   an electronic control unit configured to
   (a) compute compensation torque that reduces a pulsation component of engine torque of the internal combustion engine;
   (b) command a value in which required torque of the electric motor is combined with a computed compensation torque to the electric motor as a torque command value of the electric motor; and
   (c) correct the torque command value such that the value opposite in sign to an average torque command value is not commanded to the electric motor when the average torque command value is smaller than an amplitude of the torque command value.

2. The control device according to claim 1, wherein the electronic control unit is configured to
   (i) correct the torque command value such that the torque command value becomes equal to or larger than zero when the average torque command value is a positive value; and
   (ii) correct the torque command value such that the torque command value becomes equal to or less than zero when the average torque command value is a negative value.

3. The control device according to claim 1, wherein the number of the electric motors of the vehicle is two or more, and
   the electronic control unit is configured to control a phase of the compensation torque such that a phase in which fluctuation in a rotation of one of the electric motors that is arranged on the most downstream side in a power transmission path toward the driving shaft is minimized.

4. The control device according to claim 1, wherein the electronic control unit is configured to
   (A) estimate an average input torque value input into the driving shaft; and
   (B) correct the torque command value such that the value opposite in sign to the average torque command value is not commanded to the electric motor when an estimated average input torque value is equal to or smaller than a predetermined value and the average torque command value is smaller than the amplitude of the torque command value.

* * * * *